(12) United States Patent
Bewlay et al.

(10) Patent No.: US 7,946,335 B2
(45) Date of Patent: May 24, 2011

(54) CERAMIC CORES FOR CASTING SUPERALLOYS AND REFRACTORY METAL COMPOSITES, AND RELATED PROCESSES

(75) Inventors: Bernard Patrick Bewlay, Niskayuna, NY (US); Stephen Francis Bancheri, Albany, NY (US); Frederic Joseph Klug, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/870,200

(22) Filed: Aug. 27, 2010

(65) Prior Publication Data

US 2010/0319870 A1    Dec. 23, 2010

Related U.S. Application Data

(62) Division of application No. 11/844,515, filed on Aug. 24, 2007, now Pat. No. 7,798,201.

(51) Int. Cl.
*B22C 1/00*    (2006.01)
*B22C 9/10*    (2006.01)
(52) U.S. Cl. .................. 164/519; 164/529; 164/369
(58) Field of Classification Search .............. 164/519, 164/529, 369
See application file for complete search history.

(56) References Cited

U.S. PATENT DOCUMENTS

| | | | |
|---|---|---|---|
| 4,082,566 | A | 4/1978 | Arendt et al. |
| 4,097,292 | A | 6/1978 | Huseby et al. |
| 4,102,689 | A | 7/1978 | Borom |
| 4,119,437 | A | 10/1978 | Arendt et al. |
| 4,134,777 | A | 1/1979 | Borom |
| 4,141,781 | A | 2/1979 | Greskovich et al. |
| 4,191,720 | A | 3/1980 | Pasco et al. |
| 4,402,746 | A | 9/1983 | Ramanarayanan et al. |
| 4,563,433 | A | 1/1986 | Yeckley et al. |
| 4,837,187 | A | 6/1989 | Frank et al. |
| 5,126,082 | A | 6/1992 | Frank |
| 5,409,871 | A | 4/1995 | Dodds et al. |
| 5,580,837 | A | 12/1996 | Dodds et al. |
| 6,152,211 | A | 11/2000 | Klug et al. |
| 6,345,663 | B1 | 2/2002 | Klug et al. |
| 6,533,986 | B1 | 3/2003 | Fosaaen et al. |
| 6,676,381 | B2 | 1/2004 | Subramanian et al. |
| 2006/0130996 | A1 | 6/2006 | Bewlay et al. |

*Primary Examiner* — Kuang Lin
(74) *Attorney, Agent, or Firm* — Francis T. Coppa

(57) ABSTRACT

A rare earth-based core for use in the casting of a reactive metal is described. The core contains a ceramic composition which includes at least about 10% by weight of monoclinic rare earth aluminate ($RE_4Al_2O_9$), wherein RE represents at least one rare earth element; and at least about 10% by weight of at least one free rare earth oxide. The ceramic phase of the composition may include a microstructure which comprises a multitude of substantially spherical pores which are formed as a result of the removal of aluminum metal from the core composition during a heat treatment step. Additional embodiments relate to a method for the fabrication of a ceramic core, employing a rare earth oxide, aluminum metal, and a binder. Methods for removing cores from a cast part are also described.

11 Claims, 1 Drawing Sheet

CERAMIC CORES FOR CASTING SUPERALLOYS AND REFRACTORY METAL COMPOSITES, AND RELATED PROCESSES

CROSS REFERENCE TO RELATED APPLICATIONS

This application is a Division of U.S. patent application Ser. No. 11/844,515, entitled "CERAMIC CORES FOR CASTING SUPERALLOYS AND REFRACTORY METAL COMPOSITES, AND RELATED PROCESSES", filed Aug. 24, 2007, now U.S. Pat. No. 7,798,201 which is herein incorporated by reference.

BACKGROUND OF THE INVENTION

The present invention relates generally to refractory metal intermetallic composites and methods for preparing such materials. Some specific embodiments of the invention are directed to core constructions used in casting the materials into useful articles.

Turbines and other types of high-performance equipment are designed to operate in a very demanding environment which usually includes high-temperature exposure, and often includes high stress and high pressure. Turbine components have often been fabricated from a class of materials known as superalloys, which characteristically exhibit desirable chemical and physical properties under the service conditions generally experienced during turbine operation. Superalloys in which the base constituent is an alloy of nickel (Ni), iron (Fe), or cobalt (Co) are of particular interest in such applications, because of their ability to withstand the normally high operating temperatures of the turbine service environment.

More recently, a variety of new compositions have been developed to meet an ever-increasing threshold for high-temperature exposure. Prominent among such materials are the refractory metal intermetallic composites (RMIC's). Examples include various niobium-silicide alloys. (The RMIC materials may also include a variety of other elements, such as titanium, hafnium, aluminum, and chromium). These materials generally have much greater temperature capabilities than the current class of nickel- and cobalt-based superalloys. As an illustration, while many nickel-based superalloys have an operating temperature limit of about 1100° C., many RMIC alloys have an operating temperature in the range of about 1200° C.-1700° C. These temperature capabilities provide tremendous opportunities for future applications of the RMIC alloys (which are usually formed as single crystal and directionally-solidified castings). Moreover, the alloys are considerably lighter than many of the nickel-based superalloys.

Both superalloy and RMIC materials can be cast into useful articles, using a variety of techniques. An example of a popular technique is investment casting, sometimes referred to as the "lost wax process". Gas turbine engine blades and vanes (airfoils) are usually formed by this type of casting technique.

Turbine engine components such as airfoils usually require a selected structure of interior passageways. In most instances, the passageways function as channels for the flow of cooling air. During operation of the turbine engine, the cooling air maintains the temperature of the component within an acceptable range.

The interior passageways in these components are typically formed by the use of one or more cores. (The cores can be used to form various other holes and cavities as well). In a typical process, a ceramic core is positioned within an investment shell mold. After casting of the part, the core is removed by conventional techniques. As described below, cores can be formed of many materials, e.g., ceramic oxides such as silica, alumina, and yttria (yttrium oxide). A typical core for a turbine engine blade is depicted in U.S. Pat. No. 5,580,837 (Dodds et al).

As practiced in the art, green (unfired) cores are usually formed in desired core configurations by molding or pouring the appropriate ceramic material, with a suitable binder and other additives, into a suitably-shaped core die. After the green core is removed from the die, it is subjected to firing at elevated temperatures (usually above about 1000° C.) in one or more steps, to remove the fugitive binder, and to sinter and strengthen the core. As a result of the removal of the binder and any fillers, the fired ceramic core is porous.

In the case of casting high-performance components, cores for the molds must possess a very specific set of attributes. The core must be dimensionally stable and sufficiently strong to contain and shape the casting. Dimensional accuracy and stability are especially important in the case of many turbine components, e.g., airfoils having intricate internal passageways. Heating of the core at or above the casting temperature is often necessary prior to casting, to provide some temperature-stabilization within the core body. However, this heat treatment can lead to an undesirable amount of shrinkage. If the core were to exhibit shrinkage of greater than about 0.2% in some situations, the required dimensional accuracy and stability are difficult to achieve. In other situations, a greater degree of shrinkage can be tolerated, but "shrinkage reproducibility" may be a critical characteristic.

Core strength is also a very important consideration—especially in the case of casting high-melting materials like the RMIC's. In those cases, the strength of the core after firing must often be very high, e.g., greater than about 500 psi. High casting temperatures also require that the core have excellent refractory characteristics.

In addition to dimensional stability and a certain degree of strength, the core must also have a low "crush strength", so that the ceramic material of the core will crush before the metal being cast is subjected to tensile stress. (Otherwise, tensile stress could lead to mechanical rupture of the casting during solidification and cooling). Moreover, it is often critical that the microstructure and composition of the core allow for relatively easy removal after casting. Removal of the core is typically accomplished by leaching processes, along with other mechanical removal techniques. The porosity level of the core can be very important for minimizing compressive strength and facilitating core removal.

In many instances, the core must also be chemically inert. As an example, when casting highly reactive materials like the RMIC's, any reaction between the casting metal and certain components in the core can result in serious defects on the interior surfaces of the cast article. Niobium silicide castings are especially susceptible to adverse reaction when brought into contact at elevated temperatures with free silica and alumina from the core. (The same concern is sometimes present when casting nickel-based superalloy materials as well, e.g., when the superalloy contains substantial amounts of yttrium or hafnium).

Many ceramic compositions have been developed to address a variety of requirements for casting cores. As an example, U.S. Pat. No. 4,097,292 (Huseby and Klug) describes core compositions based on various yttrium aluminates, including yttrium aluminum perovskite (YAP), yttrium aluminum garnet (YAG), and monoclinic yttrium aluminate (YAM). The compositions consist of either single phase materials of the aluminates, or two-phase mixtures thereof. As another example, U.S. Pat. No. 5,409,871 (Dodds and Alexander) describes core compositions based on yttrium aluminate and alumina ($Al_2O_3$). Moreover, U.S. Pat. No. 6,345,663 (Klug and Giddings) describes casting core precursor materials which include alumina, aluminum metal, a polymerizable binder, and various water/organic solutions. The precursor slurry can also contain various other constituents, such as colloidal silica, hafnium, yttrium aluminate, other rare earth aluminates, magnesium, and zirconium.

It can be very difficult to attain all of the advantageous characteristics for ceramic cores, by way of a single formulation. As an illustration, while certain core materials may exhibit the high strength required for casting, they fail to exhibit the low crush strength required to prevent hot-cracking of the metal during cooling. In other cases, core materials may exhibit the required degree of both strength and stability, but fail to possess the desired "leachability" characteristics, which can be a very serious disadvantage. In still other cases, core materials meet or surpass specifications for all of these properties, but do not exhibit the chemical inertness required for casting materials like the RMIC's.

Thus, there continues to be great interest in designing unique core constructions and core fabrication processes. These innovations should help to satisfy the future demands of efficiently casting high-quality metallic alloys and composites, such as superalloy and RMIC materials.

BRIEF DESCRIPTION OF THE INVENTION

One embodiment of the invention is directed to a rare earth-based core for use in the casting of a reactive metal, containing a ceramic composition which comprises:

(a) at least about 10% by weight of monoclinic rare earth aluminate $RE_4Al_2O_9$), based on the total weight of the ceramic composition, after sintering, wherein RE represents at least one rare earth element; and (b) at least about 10% by weight (after sintering) of at least one free rare earth oxide.

Another embodiment of the invention is directed to a yttria-based core for use in the casting of a reactive metal, containing a ceramic phase which comprises at least about 10% by weight of monoclinic yttrium aluminate ($Y_4Al_2O_9$), based on the total weight of the ceramic composition after sintering. The ceramic phase includes a microstructure which comprises a multitude of substantially spherical pores in regions which previously contained aluminum metal. Substantially all of these pores are at least partially surrounded by a relatively dense shell comprising at least one material selected from the group consisting of yttrium aluminates and yttria.

A green-state ceramic core composition constitutes another embodiment of the invention. The green-state composition comprises at least about 50% by weight of at least one rare earth oxide; at least about 2% aluminum metal; and, optionally, at least one binder.

An additional embodiment relates to a method for the fabrication of a ceramic core. The method comprises these steps:

(a) combining at least one rare earth oxide like yttria, with aluminum metal and at least one binder, to form a ceramic mixture;

(b) forming the ceramic mixture into a green product of an article-shaped body; and (c) heating the green product under conditions sufficient to form a sintered ceramic core.

Another inventive embodiment is directed to a method for casting a turbine component formed of a refractory metal intermetallic composite (RMIC) or superalloy material, comprising the following steps:

(i) fabricating a ceramic core by:
(a) combining at least one rare earth oxide with aluminum metal and at least one binder, to form a ceramic mixture;
(b) forming (i.e., shaping) the mixture into a green product of an article-shaped body; and
(c) heating the green product under conditions sufficient to form a sintered ceramic core;

(ii) disposing the ceramic core in a pre-selected position within a shell mold;

(iii) introducing a molten RMIC material or molten superalloy material into the shell mold;

(iv) cooling the molten material (e.g., passively or actively), to form the turbine component within the shell mold;

(v) separating the shell mold from the turbine component; and (vi) removing the core from the turbine component, so as to form selected interior cavities within the turbine component.

Another embodiment is directed to a method for removing a rare earth-based core containing at least one $RE_4Al_2O_9$ compound from a component cast from a refractory metal intermetallic composite (RMIC) material or a superalloy material, comprising the step of contacting the core with at least one acid composition.

Other features and advantages of these embodiments will be more apparent from the following detailed description of the invention.

DETAILED DESCRIPTION OF THE INVENTION

Figure 1:
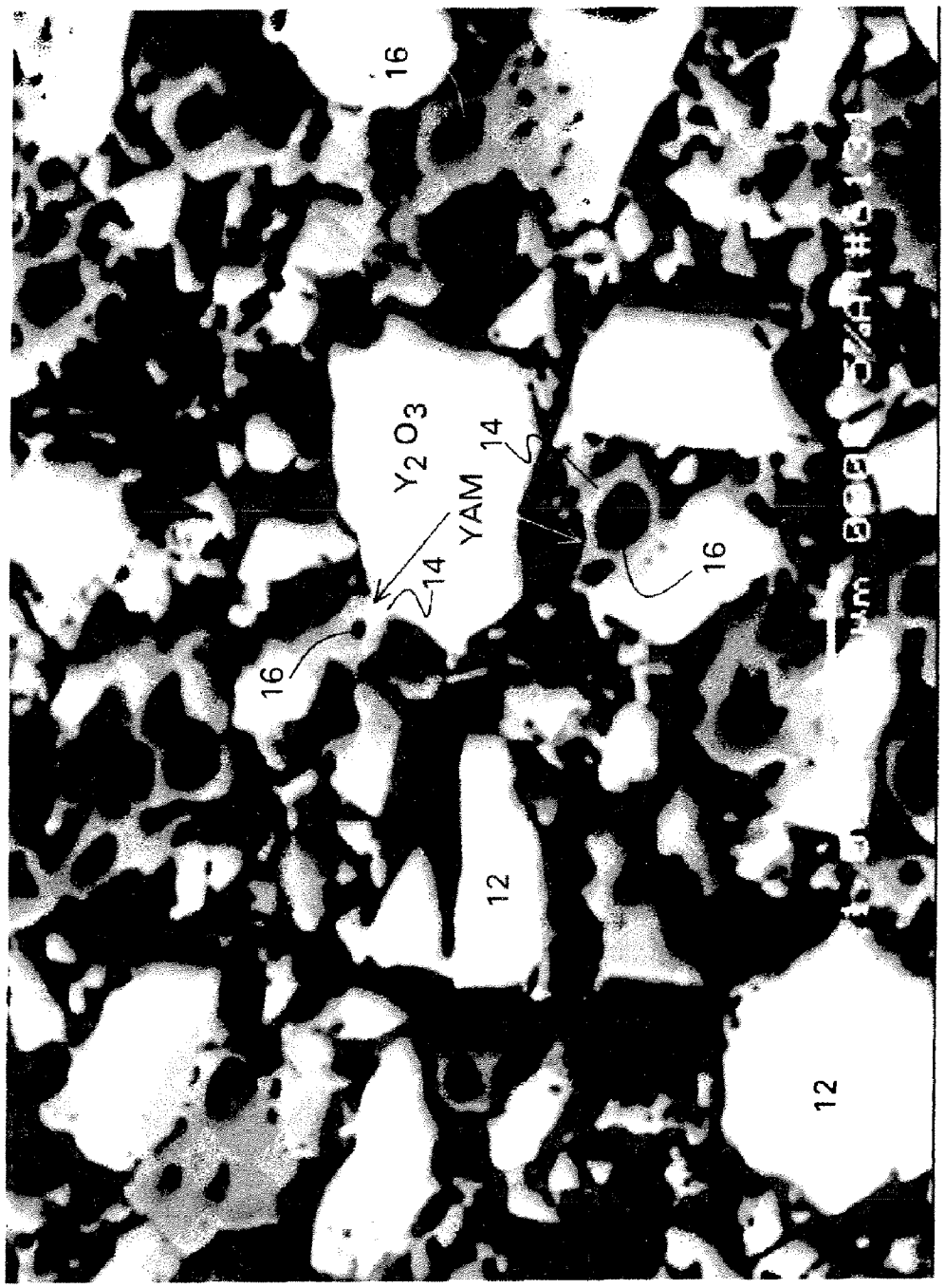
FIG. 1 is a photomicrograph of the cross-section of a yttria-based core material according to embodiments of the present invention.

The ceramic cores for the present invention are rare earth-based. As used herein, "rare earth-based" designates a composition which comprises at least about 50% by weight of at least one rare earth metal, in any form (e.g., metal or oxide), based on the total weight of the core body. The rare earth metals are as follows: lanthanum, cerium, praseodymium, neodymium, promethium, samarium, europium, gadolinium, terbium, dysprosium, holmium, erbium, thulium, ytterbium, and lutetium. In this instance, yttrium and scandium are also considered to be members of the rare earth family.

The ceramic core for the present invention comprises at least one monoclinic rare earth aluminate $RE_4Al_2O_9$, wherein "RE" represents a rare earth metal, as described previously. Non-limiting examples of the monoclinic rare earth aluminates are as follows: monoclinic yttrium aluminate, erbium aluminate, dysprosium aluminate, ytterbium aluminate, and combinations thereof. Monoclinic yttrium aluminate ($Y_4Al_2O_9$), is the preferred rare earth aluminate in many embodiments. (Those skilled in the art understand that there may be slight differences in the stoichiometric proportions of elements in the formula set forth above, but such variations still fall within the scope of "monoclinic rare earth aluminates").

The monoclinic rare earth aluminate may be incorporated into the core composition by various methods. As an example, the material can be prepared at any suitable location, e.g., where core fabrication is taking place. The material (in powder or slurry form, for example) can then be blended with the other core material ingredients to begin the fabrication process, as further described below.

As an alternative, the monoclinic rare earth aluminate can be formed, in situ, in the core composition. For example, one or more rare earth metals, in powder form, can be blended with aluminum powder and/or alumina powder, and various other ingredients, and then shaped into a core. When the core is fired at elevated temperatures, the monoclinic rare earth aluminate component is formed. Further details regarding this process are also provided below. The presence of monoclinic rare earth aluminate can provide unique advantages to the core, in terms of various physical properties and "leachability".

The amount of monoclinic rare earth aluminate present in the core composition will depend on a variety of factors. Some of those factors are as follows: the type of material being cast with the core; the required hardness and strength of the core; the identity of the other constituents in the core composition (including the identity of the specific rare earth metals); the leaching characteristics required for the core (as well as its porosity); and the required chemical characteristics of the core (e.g., chemical inertness).

In general, the rare earth-based core will comprise at least about 10% by weight of monoclinic rare earth aluminate. (The level of monoclinic rare earth aluminate is based on the total weight of the ceramic portion of the composition, after any sintering steps subsequently undertaken. In most cases, substantially all non-ceramic material is no longer present after sintering). Typically, the level of monoclinic rare earth aluminate will be at least about 20% by weight, and more often, at least about 30% by weight. In some embodiments which are preferred for certain applications (e.g., when the casting material is an RMIC), the level of monoclinic rare earth aluminate is usually at least about 40% by weight. Those skilled in the art will be able to select the most appropriate level of monoclinic rare earth aluminate, based in large part on the teachings herein.

In some preferred embodiments which often involve use of the core to cast turbine engine components, the monoclinic rare earth aluminate comprises monoclinic yttrium aluminate ($Y_4Al_2O_9$), sometimes referred to as "YAM". Monoclinic yttrium aluminate is a material known in the art, and described, for example, by S. Parukuttyamma et al in "Yttrium Aluminum Garnet (YAG) Films Through a Precursor Plasma Spraying Technique", J. Am. Ceram. Soc., 84 [8] 1906-1908 (2001). This article is incorporated herein by reference. Monoclinic yttrium aluminate is also described in U.S. Pat. No. 4,563,433 (Yeckley et al), which is also incorporated herein by reference.

The core of this invention also contains at least one rare earth metal oxide, after sintering. Oxides of the various rare earth metals set forth above can be present. In some specific embodiments, the rare earth metal oxide is selected from the group consisting of yttrium oxide (yttria), cerium oxide, erbium oxide, dysprosium oxide, ytterbium oxide, and combinations thereof. Yttria is often a preferred oxide. As used in herein, this constituent is a "free" rare earth oxide, i.e., not chemically bonded to any other species, e.g., to a metal to form a silicate.

The amount of free rare earth metal oxide which is present in the core (after sintering) will depend on various factors. (In general, a higher level of monoclinic rare earth aluminate will result in the presence of lower levels of the free rare earth oxide.) Very often, the core comprises at least about 10% by weight (after sintering) of one or more of the rare earth oxides. (These levels include the total amount of rare earth oxides, i.e., if there is more than one rare earth oxide present). In some preferred embodiments, the amount of rare earth oxide present (after sintering) is at least about 25% by weight, e.g., in the range of about 25% by weight to about 75% by weight. In casting cores for selected end uses, the amount of rare earth oxide present can be at least about 40% by weight.

The core of this invention comprises at least two phases (aluminate and rare earth oxide). However, the composition may further include other phases of the rare earth material(s). As an illustration in the case of a yttria-based system, the core may also comprise yttrium aluminum perovskite (YAP). While the amount of YAP may vary, it is often in the range of about 20% by weight to about 40% by weight of the amount of YAM present. Another component often present in the yttria core composition is yttrium aluminum garnet (YAG). The amount of YAG present may also vary, but is often in the range of about 5% to about 20% of the amount of YAM present. It should be understood that these components—in the case of yttria or other rare earths—are usually formed in situ, e.g., by the reaction of the rare earth metal and an aluminum-containing component like aluminum, during a heat treatment step. In some instances, their presence should be minimized, due to an adverse effect on leachability. Thus, in some embodiments for the yttria-based system, the amount of YAP present should be less than about 10% by weight, based on the total weight of the ceramic composition, after sintering. The amount of YAG present should preferably be less than about 5% by weight, after sintering. In some especially preferred embodiments, the total amount of YAP and YAG should be less than about 25% by weight (after sintering), based on the total weight of the ceramic portion of the composition.

In some embodiments, the core, after being sintered, is substantially free of alumina. In other embodiments, the core does include alumina. The amount of alumina present is usually no greater than about 10% by weight. In some specific embodiments, the amount of alumina present is less than about 2% by weight, based on the total weight of the ceramic composition, after sintering.

In some embodiments in which aluminum metal was used to form the core, a unique microstructure is present after the core has been sintered. In this instance, the ceramic phase includes a microstructure which comprises a multitude of pores. The pores are voids where the aluminum metal had been present initially, but has subsequently been transformed into compounds such as alumina. The pores usually have an average diameter in the range of about 1 micron to about 40 microns. More often, the average diameter of the pores is in the range of about 2 microns to about 10 microns.

As shown in FIG. 1 (discussed below), each pore formed in this manner is at least partially surrounded by at least one material selected from the group consisting of yttrium aluminates and yttria. Alumina, if present in the sintered core, may also partially surround the pores. (As further described below, the pores caused by the aluminum removal are generally quite distinct from pores formed from binder removal).

The core body (i.e., prior to sintering, in the "green state") comprises at least about 50% by weight of at least one rare earth oxide (total), based on total solids loading. (As used herein, "solids loading" refers to the total amount of ceramic and metal constituents). In some preferred embodiments, the green-state composition comprises at least about 75% of at least one rare earth oxide. In some specific instances, the green-state composition comprises at least about 90% of at least one rare earth oxide. As mentioned above, the green-state composition also comprises at least about 2% by weight aluminum metal, based on total solids loading, with a maximum which is usually about 10% by weight.

The green-state core body can also contain other constituents. As an example, the material forming the core body usually contains at least one binder, which functions in part to hold together all of the ceramic constituents, prior to the initiation of any heat treatment. Non-limiting examples of binders include organometallic liquids; wax-based compositions; thermosetting resins, and combinations thereof. In some embodiments, the binder comprises a material which will polymerize when the core body is heat-treated. Moreover, in some cases, the binder comprises materials which will decompose and at least partially convert to a ceramic oxide, via the heat-treatment.

The choice and amount of a particular binder will depend on various factors, such as the particular composition of the ceramic materials in the core body, and the manner in which the body is formed (discussed below). Usually, the binder (its total volume, as supplied) is present at a level in the range of about 25% by volume to about 65% by volume, based on the total volume of the core body. Methods for incorporating the binder into the core body material are well-known, e.g., using conventional, high-shear mixing equipment at room temperature or elevated temperatures. Aqueous or organic solvents can also be incorporated into the core body material (e.g., to form a ceramic slurry), depending in part on the manner in which the core will be formed.

The core body can be formed by a variety of conventional techniques. Many references describe the manufacture and use of cores, e.g., U.S. Pat. No. 6,720,028 (Haaland); U.S. Pat. No. 6,494,250 (Frank et al); U.S. Pat. No. 6,345,663 (Klug et al); U.S. Pat. No. 6,152,211 (Klug et al); and U.S. Pat. No. 4,164,424 (Klug et al), which are all incorporated herein by reference. Specific, non-limiting examples of suitable techniques include injection molding, transfer molding, compression molding, die pressing, investment casting, coagulation casting, gel casting, slip casting, extrusion, and combinations thereof. As those skilled in the art understand, the core body is usually in the form of a "green", uncured product at this stage. (In some embodiments, the green body of the present invention is substantially free of alumina).

After the core body has been formed, it is subjected to a heat treatment. The heating conditions (time and temperature) are selected to achieve several objectives. First, the heating regimen is one which is sufficient to vaporize substantially all of the volatile material (e.g., the liquid solvent associated with the binder). The heat-treatment also serves to strengthen the green product, for better handling in subsequent process steps. Moreover, in many cases, e.g., with a wax binder, the heat treatment also removes a substantial portion of the binder, e.g., about 90% to about 100% of the weight of the binder originally incorporated into the core body. However, in other cases, e.g., when using a binder formed of a silica material such as colloidal silica, a portion of the binder (like silica) remains as part of the core. (As described below, the heat treatment also causes the formation of a certain type of aluminum metal-related pore structure).

Since the density of the core is important in some circumstances, the heating conditions are also selected accordingly. Thus, heating is usually undertaken to provide the core with a density of about 50% to about 80% of its theoretical density. In this manner, the core body includes a level of surface-connected porosity (i.e., porosity which is open to the external surface), which is important for subsequent processing steps. The porosity results in part from the particle size and the particle size-distribution of the starting powders, as well as the removal of the binder. The heating regimen is usually selected specifically to provide the required porosity level. In some specific embodiments, the core body is heated under conditions sufficient to provide the core with a density of about 55% to about 75% of its theoretical density.

The temperature of the heat treatment for the core will depend on various factors, in addition to the desired density characteristics. These include: the particular constituents in the core body, including ceramic materials, binder materials, and solvents; the physical size of the core body; as well as the type of heating technique employed. In general, the heat-treatment temperature is typically in the range of about 900° C. to about 1800° C. When the core body is formed from a composition comprising at least about 75% by weight (before the heat treatment) of free rare earth oxide (e.g., free yttria), the heat-treatment temperature is usually in the range of about 1200° C. to about 1800° C., and more often, from about 1500° C. to about 1800° C.

The overall heating times will also depend on the factors described above, but usually range from about 15 minutes to about 100 hours. As those skilled in the art understand, higher temperatures sometimes compensate for shorter heating times, while longer heating times sometimes compensate for lower temperatures, within these ranges. Moreover, the heat treatment need not be carried out under one particular time/temperature schedule. As an example, lower temperatures could initially be used to primarily remove volatile materials and provide the core body with a minimum of green strength. These temperatures could be as low as the vaporization point of the lowest-boiling volatile component in the core body (and perhaps lower, e.g., if a vacuum was applied). (Thus, choice of a particular binder system can influence heat treatment times). The temperature could then be raised, rapidly or gradually, to the temperature required to provide the density levels discussed previously.

Moreover, the temperature may be temporarily held at any "plateau", e.g., to allow for complete removal of solvent and volatile binder. Those skilled in the art will be able to select the most appropriate heating regimen for a particular situation. Heating is usually (though not always) carried out in a furnace. The furnace environment can vary, depending on the particular situation. As an example, heating can be carried out in air, nitrogen, a vacuum, hydrogen, hydrogen/water mixtures; an inert atmosphere (e.g., argon), and various combinations of the foregoing, when safety and practicality permit.

In some preferred embodiments, it is very useful to employ a heating regimen with three general stages: (1) melting and removal of the binder material (e.g., a wax system); (2) oxidation of the aluminum metal to alumina; and (3) sintering. A non-limiting example can be provided in the case of a yttria-based system and a conventional wax binder. In that case, the temperature range for the binder-melting/removal stage may be about 350° C. to about 450° C. (In many instances, wax-based binders actually begin to melt at lower temperatures, e.g., about 85° C. or even lower). The oxidation stage might be in the range of about 600° C. to about 1100° C. Sintering would typically occur above about 1200° C. As mentioned above, each stage could involve an appropriate hold-time or plateau. (The stages can also overlap). The most suitable temperatures and hold-times can be based in part on previous experimental results for similar core materials. As described previously, the resulting microstructure includes a multitude of pores which represent the remnants of aluminum metal, and which are in addition to the typical porosity found in ceramic cores.

After the heat-treatment ("firing") of the core is complete, a casting or molding operation can take place. As one example, the core can be used in the investment casting of turbine engine components. In such a process, the core is usually employed as part of a mold-core assembly, to form the component, e.g., a turbine blade. Typically, the core and appropriate ancillary material known to those skilled in the art (e.g., positioning pins and support pins, sprues, gates, etc) are positioned in a die, appropriately shaped in accordance with the design of the component to be cast. Wax is then usually injected into the die and solidified, to form a wax model. The wax model, containing the embedded core, is repeatedly dipped in ceramic slurry, to form a ceramic shell mold around the wax pattern.

When the wax has been removed, the ceramic core remains in place, disposed in and attached to the ceramic shell mold, thereby forming the mold-core assembly referred to above. After casting the component by solidifying molten metal in the mold-core assembly, the ceramic mold is removed, e.g., by chemical or mechanical means. The core can then be leached out by conventional techniques, e.g., use of a chemical removal agent.

A surprising discovery related to this invention was that monoclinic rare earth aluminates in a core, such as $Y_4Al_2O_9$, can be successfully removed, e.g., leached out with acids such as nitric acid. In contrast, other aluminum compounds such as YAG and YAP cannot be substantially leached out with most acids. Moreover, the porous microstructure of cores based on monoclinic rare earth aluminates can considerably enhance the effectiveness of the leaching process after casting has been completed. Furthermore, the presence of the pores can reduce the modulus and increase the "compliance" of the core, which can, in turn, minimize stress on the component after casting is complete.

Furthermore, the strength and dimensional stability of the cores prepared according to embodiments of this invention represent important advantages in the overall casting process. In particular, cores based on monoclinic rare earth aluminates appear to exhibit very desirable shrinkage-behavior characteristics, e.g., resistance to shrinkage, and shrinkage-reproducibility. As emphasized previously, dimensional accuracy and stability are critical parameters related to the manufacture of turbine components.

Another embodiment of this invention relates to a process for removing a rare earth-based core containing one or more $RE_4Al_2O_9$ compounds from an RMIC-based part. As mentioned above, the present inventors discovered that cores containing monoclinic aluminates like YAM can be successfully removed from a casting by leaching with one or more acids. The RMIC-based parts (i.e., those containing at least about 50% by weight RMIC material) can be formed from niobium silicide materials, for example. The cores which are used in the selected casting process usually contain at least about 10% by weight (total) of the $RE_4Al_2O_9$ compounds, and more often, at least about 20% by weight of the compounds.

Acids and acid-based treatment compositions (e.g., aqueous solutions) suitable for carrying out this process are described in U.S. patent application Ser. No. 11/276,002 (Klug et al), filed on Feb. 9, 2006, and incorporated herein by reference. Examples include hydrochloric acid, nitric acid, phosphoric acid, nitric/phosphoric acid, sulfuric acid, acetic acid, and various other combinations of the foregoing.

The core is treated with an effective amount of the acid-based composition, i.e., an amount effective to remove substantially all of the core material. (Post-treatment steps can also be undertaken to remove residual core material, e.g., air-blowing, washing, and the like. The effective amount of the acid(s) will depend on a variety of factors, such as the particular composition of the core (e.g., how much $RE_4Al_2O_9$ compound is present); the acid system being used; and the type of alloy being cast, using the core. As a general guideline for some situations, the core can be treated with one or more of the following acids: about 5% to about 91% concentration nitric acid, about 2% to about 37% concentration HCl acid, about 50% to about 85% concentration phosphoric acid, about 5% to about 30% concentration sulfuric acid, and about 30% to about 90% concentration acetic acid. A factor in selecting a particular acid is its ability to dissolve the core material, while being substantially non-reactive with the material being cast, e.g., the niobium silicide. The preferred acid treatment composition often comprises nitric acid (e.g., an azeotropic mixture thereof); or a combination of nitric acid and phosphoric acid.

As noted in application Ser. No. 11/276,002, the acid treatment composition is usually heated, e.g., to its boiling temperature or slightly below that temperature, at a selected pressure. A variety of treatment techniques may be employed to dissolve the core. Most often, the casting is immersed in a bath which holds the acid composition. (The bath is often agitated). As shown in the examples in the referenced patent application, treatment times can vary as well. Those skilled in the art will be able to select the most appropriate acid composition, as well as the most appropriate heating regimen. (In some instances, care must be taken if leaching is being carried out with acid-based compositions to remove cores from superalloy castings, due to the adverse effect of some acids on the superalloy).

EXAMPLES

The examples which follow are merely illustrative, and should not be construed to be any sort of limitation on the scope of the claimed invention.

Example 1

A core was prepared by dry-mixing a composition based on 5% by weight aluminum metal powder with yttria. A commercial, paraffin-based hydrocarbon wax composition was also incorporated into the mixture by blending at about 90° C., to render the ceramic/binder mixture fluid-like. The composition was then extruded into test bars having dimensions of 50 mm×12.5 mm×4 mm.

A heat treatment followed, carried out in a conventional oven, with an air atmosphere. The heat treatment schedule involved three major stages: approximately 100° C.-400° C. for wax melting and removal; approximately 650° C.-1100° C. for aluminum oxidation; and then sintering at 1200° C.-1700° C. Multiple hold-times were present at various temperatures within and between the stages. The overall heat treatment time was about 50 hours.

FIG. 1 is a cross-sectional SEM (scanning electron microscope), at 1000× magnification, of a test bar of the sintered material prepared generally according to the technique set forth above. The ceramic phase includes yttria particles 12 (generally white in color), along with attached regions or particles 14 of YAM (generally darker, i.e., off-white in appearance).

As mentioned previously, the unique microstructure of FIG. 1 includes a multitude of pores 16. The pores were initially sites of aluminum metal, prior to the transformation of aluminum into compounds such as alumina. It can be seen in the FIGURE that substantially all of the pores 16 are at least partially surrounded by the YAM regions 14, which form a relatively dense shell around the pores. The pores 16 may enhance the leachability of the core material after the subsequent casting step is completed. (These pores are generally very distinct from those formed by removal of the wax. In the latter case, the pores are generally interconnected and irregularly shaped, whereas these aluminum-residue pores are generally closed and spherical.)

Example 2

A core was prepared by dry-mixing a composition based on 5% by weight aluminum metal powder with yttria. The hydrocarbon wax of Example 1 was also incorporated into the mixture, by blending at about 90° C., to render the ceramic/binder mixture fluid-like. The composition was then extruded into test bars having dimensions of 50 mm×12.5 mm×4.0 mm.

The samples were heated slowly at low temperatures, to completely remove the binder system from the bars. The samples were then heat-treated to a sintering temperature of 1700° C. for about 1 hour. After the final firing step, the average shrinkage of the bars was approximately 2.5% The average strength of the test bars was about 1530 psi.

One of the samples was then analyzed for the composition of the bulk phase. The sample was crushed and then mixed by hand. Quantitative X-Ray diffraction (XRD) analysis was then performed on the crushed powder, to determine the overall composition of the sample. Table 1 provides a listing of each phase identified, along with its relative compositional level:

TABLE 1

| COMPONENT | WEIGHT % |
|---|---|
| Yttria | 53.8 |
| YAM ($Y_4Al_2O_9$) | 34.7 |
| YAP ($YAlO_3$) | 10.0 |
| YAG ($Y_3Al_5O_{12}$) | 1.5 |
| Alumina | 0.0 |

Example 3

A core was prepared by dry-mixing a composition based on 5% by weight aluminum metal powder with yttria. As in Example 2, the hydrocarbon wax was incorporated into the mixture by blending at about 90° C., to render the ceramic/binder mixture fluid-like. The composition was then extruded into test bars having dimensions of 50 mm×12.5 mm×4.0 mm.

The samples were heated slowly at low temperatures to completely remove the binder system from the bars, and then further heat-treated to a sintering temperature of 1600° C.

One of the bars was then prepared for leaching, by weighing an initial weight of the sintered bar sample. The bar weighed 4.1 g. The sample bar was placed in a Teflon®-sealed container which also contained 69% nitric acid. The Teflon container was then placed in an oil bath of 110° C., for a total time of 4 hours. An attempt was then made to remove the sample from the container. However, only a small amount (less than 0.4 g) of residual powder remained, settled on the bottom of the container. The large weight change confirms the excellent leaching characteristics of this material.

The remnant powder in the nitric acid solution was filtered, to separate the acid from the powder. The filtered powder was then dried overnight. Quantitative XRD analysis was then done on the remnant powder to identify the composition. Table 2 provides a listing of each phase identified, along with its relative compositional level.

TABLE 2

| COMPONENT | WEIGHT % |
|---|---|
| Yttria | 3 |
| YAM ($Y_4Al_2O_9$) | 0 |
| YAP ($YAlO_3$) | 64 |
| YAG ($Y_3Al_5O_{12}$) | 18 |
| Alumina | 15 |

The data provides confirmation that the YAM phase was substantially removed with the nitric acid solution, and is no longer present in the remnant powder.

The present invention has been described in terms of some specific embodiments. They are intended for illustration only, and should not be construed as being limiting in any way. Thus, it should be understood that modifications can be made thereto, which are within the scope of the invention and the appended claims. Moreover, as used throughout this disclosure, the terms "a" and "an" do not denote a limitation of quantity, but rather denote the presence of at least one of the referenced items. The suffix "(s)" as used herein is intended to include both the singular and the plural of the term that it modifies, thereby including one or more of that term (e.g., the "binder" includes one or more binders). Furthermore, all of the patents, patent applications, articles, and texts which are mentioned above are incorporated herein by reference.

The invention claimed is:

1. A method for the fabrication of a ceramic core, comprising the following steps:
    (a) combining at least one rare earth oxide with aluminum metal and at least one binder, to form a ceramic mixture;
    (b) forming the ceramic mixture into a green product of an article-shaped body; and
    (c) heating the green product under conditions sufficient to form a sintered ceramic core, wherein the core comprises (I) at least about 10% by weight of monoclinic rare earth aluminate ($RE_4Al_2O_9$), after sintering, wherein RE represents at least one rare earth element; and (II) at least about 10% by weight, after sintering, of at least one free rare earth oxide.

2. The method of claim 1, wherein the rare earth oxide comprises yttria; and the binder comprises at least one wax material.

3. The method of claim 1, wherein the mixture of step (a) is a ceramic slurry, which is formed into the green product in step (b).

4. The method of claim 3, wherein the ceramic slurry is formed into the green product in step (b) by a technique selected from the group consisting of injection molding, transfer molding, compression molding, die pressing, investment casting, gel casting, slip casting, extrusion, and combinations thereof.

5. The method of claim of claim 1, wherein the conditions of heating step (c) are sufficient to convert all of the aluminum metal into aluminum oxide, forming a microstructure which comprises a multitude of pores in locations in which aluminum metal was present before the heating step.

6. The method of claim 2, wherein the conditions of heating step (c) are sufficient to form at least about 20 weight % monoclinic yttrium aluminate ($Y_4Al_2O_9$), based on the total weight of the sintered ceramic core.

7. The method of claim 5, wherein step (c) is carried out in at least 3 stages.

8. The method of claim 7, wherein the stages comprise (i) melting and removal of the binder material; (ii) oxidation of the aluminum metal to alumina; and (iii) sintering.

9. A method for casting a turbine component formed of a refractory metal intermetallic composite (RMIC) or superalloy material, comprising the following steps:
- (i) fabricating a core by:
  - (a) combining at least one rare earth metal oxide, aluminum metal, and at least one binder, to form a ceramic mixture;
  - (b) forming the ceramic mixture into a green product of an article-shaped body; and
  - (c) heating the green product under conditions sufficient to form a sintered ceramic core which comprises after sintering, at least about 10% by weight of at least one monoclinic rare earth aluminate; and at least about 10% by weight, after sintering, of at least one free rare earth oxide.
- (ii) disposing the ceramic core in a pre-selected position within a shell mold;
- (iii) introducing a molten RMIC material or molten superalloy material into the shell mold;
- (iv) cooling the molten material, to form the turbine component within the shell mold;
- (v) separating the shell mold from the turbine component; and
- (vi) removing the core from the turbine component, so as to form selected interior cavities within the turbine component.

10. The method of claim 9, wherein the rare earth metal oxide of step i(a) comprises yttria; and the amount of aluminum metal present is in the range of about 2% by weight to about 10% by weight, based on total solids loading.

11. The method of claim 9, wherein the turbine component being cast is a turbine blade.

* * * * *